(No Model.)
C. E. BARTRAM.
SIDEWALK CLEARER.
No. 327,990. Patented Oct. 13, 1885.
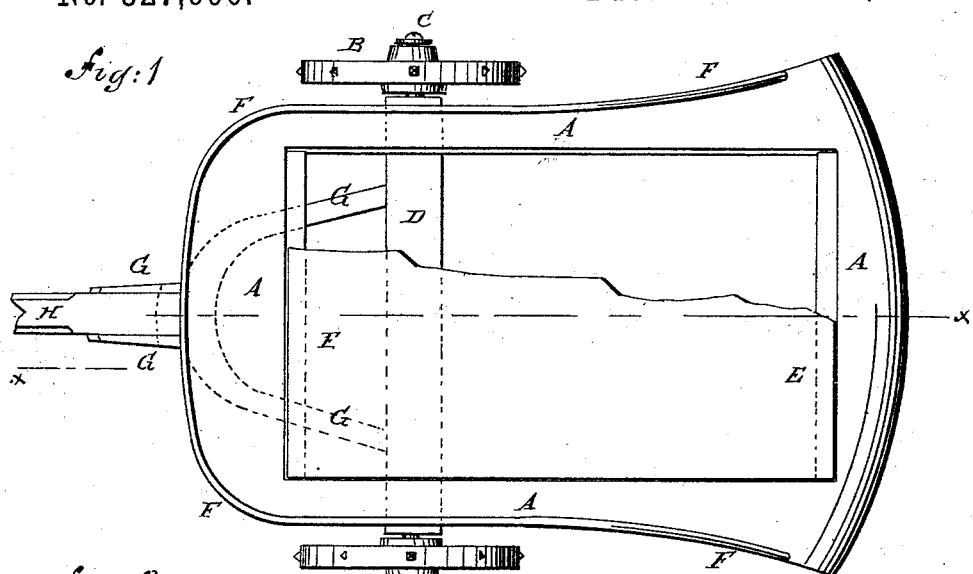
Fig: 1
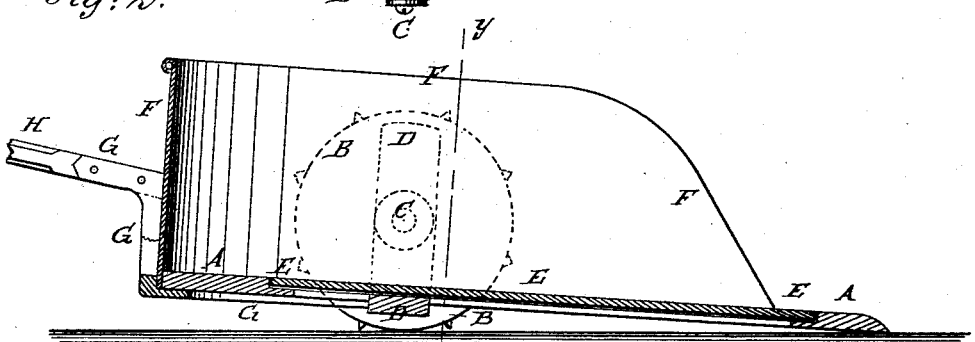
Fig: 2.
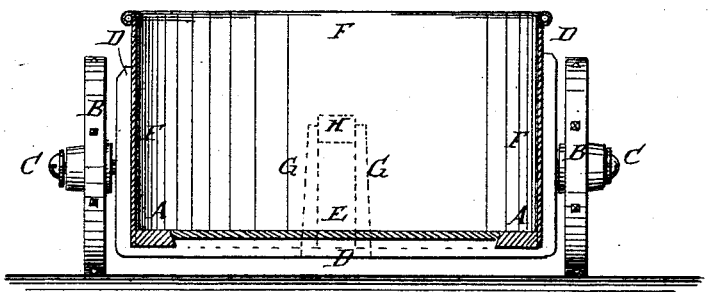
Fig: 3.
WITNESSES:
Chas. Nida
C. Sedgwick
INVENTOR:
C. E. Bartram
BY Munn &Co
ATTORNEYS.

UNITED STATES PATENT OFFICE.

CHARLES E. BARTRAM, OF FREDONIA, NEW YORK.

SIDEWALK-CLEARER.

SPECIFICATION forming part of Letters Patent No. 327,990, dated October 13, 1885.

Application filed October 14, 1884. Serial No. 145,457. (No model.)

*To all whom it may concern:*

Be it known that I, CHARLES E. BARTRAM, of Fredonia, in the county of Chautauqua and State of New York, have invented a new and useful Improvement in Sidewalk-Clearers, of which the following is a full, clear, and exact description.

Reference is to be had to the accompanying drawings, forming a part of this specification, in which similar letters of reference indicate corresponding parts in all the figures.

Figure 1 is a plan view of one of my improved sidewalk-clearers, part being broken away. Fig. 2 is a sectional side elevation of the same, taken through the line $x\ x$, Fig. 1. Fig. 3 is a sectional front elevation of the same, taken through the line $y\ y$, Fig. 2.

The object of this invention is to facilitate the removal of snow and ice from sidewalks and other places.

The invention relates to a sidewalk-clearer constructed with a base-frame widened toward its forward end, having its forward edge rounded on the upper side, and provided with a bottom, and with a flange at its sides and rear end, the U-shaped bar, the axles, and the wheels for carrying the clearer, and a handle bracket and handle for guiding and controlling the said clearer, as will be hereinafter fully described and claimed.

A represents an iron frame the forward edge of which is rounded upon the upper side, as shown in Figs. 1 and 2. The frame A is widened at its forward end, as shown in Fig. 1, so that the wheels B will have a cleared surface to travel upon. The wheels B are made with spiked or otherwise roughened rims to prevent them from slipping, and their axles C are formed upon or attached to the middle parts of the upright arms of the U-shaped bar D, to the horizontal middle part of which is attached the rear parts of the frame A. The inner edges of the front and rear parts of the frame A are rabbeted upon the upper side to form a seat for the wooden bottom E, as shown in Figs. 1 and 2. To the side edges and to the rounded rear edge of the frame A is attached an upright flange, F, which forms the sides and back of the clearer.

To the bottom of the rear part of the frame A and to the U-bar D is attached the forked base of the bracket G, which extends upward upon the rear part of the flange F, and then extends to the rearward, and to it is attached the forward end of the handle H. The a -bracket G thus strengthens the rear part of the clearer and supports the handle in a favorable position for guiding and controlling the said clearer.

Having thus described my invention, I claim as new and desire to secure by Letters Patent—

1. A sidewalk-clearer constructed substantially as herein shown and described, and consisting of a base-frame widened toward its forward end, having the upper side of its forward edge rounded, and provided with a bottom, E, and flange F, wheels, axles, and a U-bar, B C D, for carrying the machine, and a handle-bracket, G, and handle H, for guiding and controlling the clearer, as set forth.

2. In a sidewalk-clearer, the frame A, made substantially as herein shown and described, with a widened forward end to clear a track for the wheels, and a forward edge rounded upon its upper side to separate the snow and ice from the sidewalk, as set forth.

3. In a sidewalk-clearer, the combination, with the open frame A, having a seat formed around its inner edge to receive a separate bottom, and flange F, of the wheels B, axles C, and U-shaped bar D, substantially as herein shown and described.

4. In a sidewalk-clearer, the combination, with the frame A, the U-shaped bar D, carrying the axles, and the flange F, of the handle-bracket G and the handle H, substantially as herein shown and described, whereby the clearer can be readily guided and controlled, as set forth.

CHARLES E. BARTRAM.

Witnesses:
F. C. CHATSEY,
ELIAS FORBES.